United States Patent [19]

Fish, Jr. et al.

[11] Patent Number: 4,552,805

[45] Date of Patent: Nov. 12, 1985

[54] COMPOSITES REINFORCED WITH HIGH STRENGTH ARAMID FIBERS HAVING FIBRILLATED ENDS

[75] Inventors: Floyd H. Fish, Jr.; Herbert G. Lauterbach, both of Wilmington, Del.

[73] Assignee: E. I. Du Pont de Nemours and Company, Wilmington, Del.

[21] Appl. No.: 682,171

[22] Filed: Dec. 17, 1984

[51] Int. Cl.[4] .............................................. B32B 5/06
[52] U.S. Cl. ...................................... 428/297; 57/907; 428/362; 428/364; 428/399; 428/413; 428/902
[58] Field of Search ............... 428/297, 362, 364, 399, 428/413, 902; 57/907

[56] References Cited

U.S. PATENT DOCUMENTS

| | | | |
|---|---|---|---|
| 3,591,395 | 7/1971 | Zonsveld et al. | 106/99 |
| 4,261,754 | 4/1981 | Krenchel et al. | 106/99 |
| 4,310,478 | 1/1982 | Balslev et al. | 264/22 |
| 4,374,978 | 2/1983 | Fujiwara et al. | 264/184 |
| 4,387,178 | 6/1983 | Tracy et al. | 428/394 |
| 4,414,030 | 11/1983 | Restrepo | 106/99 |
| 4,477,526 | 10/1984 | Lauterbach | 428/399 |

FOREIGN PATENT DOCUMENTS 0032421  1/1981  European Pat. Off. .

*Primary Examiner*—James J. Bell

[57] ABSTRACT

A composite comprising a matrix resin reinforced with a sliver of high modulus p-aramid fibers of which at least 10% of the fiber ends are fibrillated into at least 2 fibrils along a terminal length which is at least 5 times as long as the diameter of the unfibrillated portion of the fiber.

8 Claims, 1 Drawing Figure

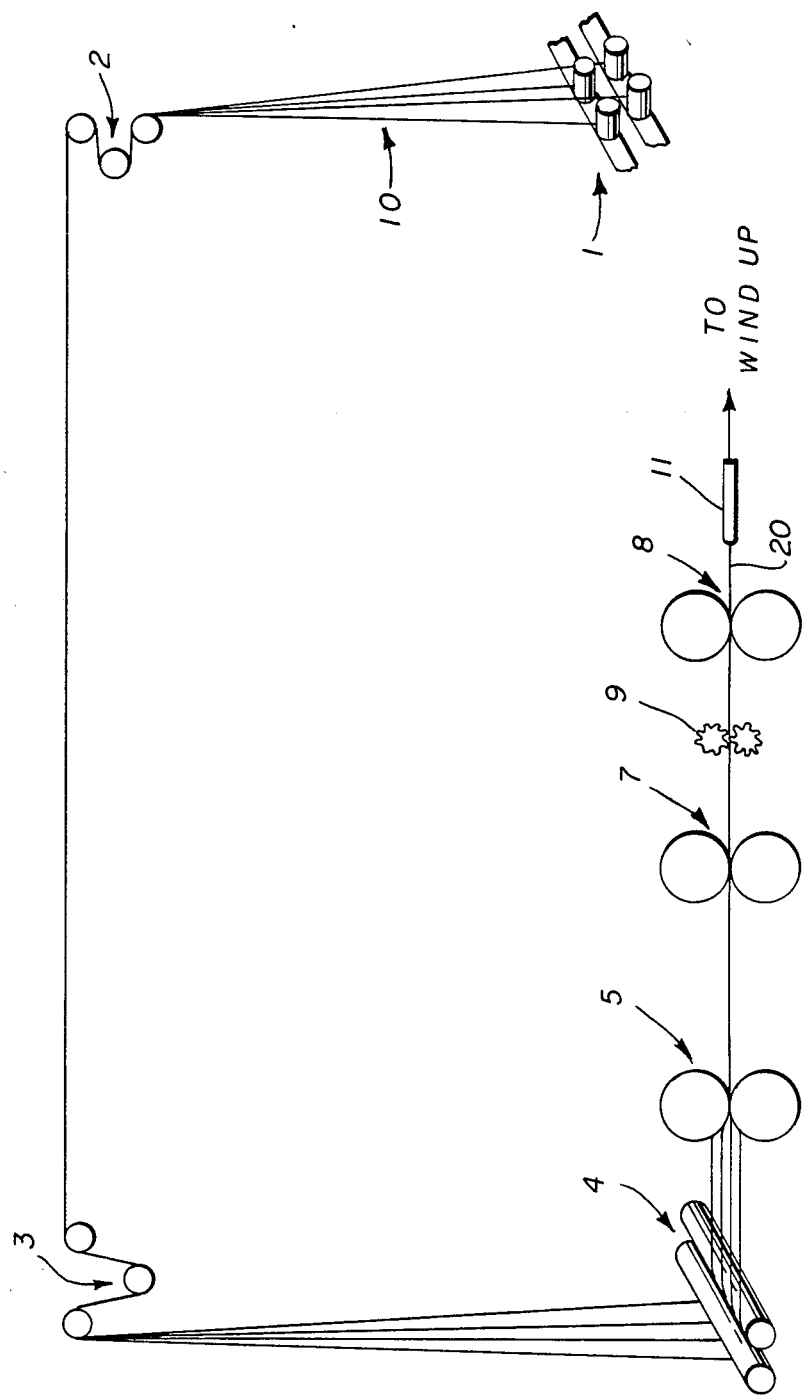

COMPOSITES REINFORCED WITH HIGH STRENGTH ARAMID FIBERS HAVING FIBRILLATED ENDS

BACKGROUND OF THE INVENTION

The term "aramid" is used to designate wholly aromatic polyamides. Not all aramid fibers are useful in the present invention but only those derived from aromatic polyamides whose chain extending bonds are either coaxial or parallel and oppositely directed. High strength, high modulus aramid fibers useful in the present invention may be prepared by the processes described in U.S. Pat. Nos. 3,767,756 and 3,869,430. These fibers will be referred to hereinafter as p-aramid fibers. Particularly preferred are p-aramid fibers based on poly(p-phenylene terephthalamide) as produced by Du Pont under the trademark Kevlar ®.

Composite sheets of continuous p-aramid filament reinforced resin have been made. One technique is to prepare a warp of the filaments as by winding on a frame, impregnating with resin and hot-pressing to form a thin flat sheet which is cut from the frame. Several such sheets are then cross-lapped and again hot-pressed to form the final reinforced composite product. Such composites have high tensile strength and stiffness.

Problems occur when attempts are made to produce three-dimensional articles, particularly those with sharp bends, by hot-pressing continuous p-aramid filament-containing resin sheets. The shaped articles exhibit uneven areas and wrinkles as well as slack filaments. This is an indication of inadequate conformance to the mold.

The use of staple p-aramid fiber as reinforcement substantially overcomes the wrinkling problem referred to above but at a great sacrifice to strength and stiffness of the composites. Use of certain stretch broken, high strength, high modulus p-aramid fibers as the reinforcement has now been found to alleviate the aforementioned problems.

SUMMARY OF THE INVENTION

A composite comprising a matrix resin reinforced with sliver of high modulus p-aramid fibers of which at least 10% of the fiber ends are fibrillated into at least 2 fibrils along a terminal length which is at least 5 times as long as the diameter of the unfibrillated portion of the fiber. Shaped non-planar structures formed therefrom, whether cured or not are also encompassed.

DESCRIPTION OF THE DRAWINGS

The FIGURE is a schematic representation of apparatus suitable for use in the present invention.

DETAILED DESCRIPTION OF THE INVENTION

A process for making sliver useful as reinforcement for the composites of the present invention can be generally described as feeding a yarn or tow of continuous p-aramid filaments having a yarn tenacity of at least 16 grams per denier (gpd) and a yarn modulus of at least 400 gpd under low tension into a tensioning zone, tensioning the filaments almost to their breaking tension, randomly breaking the tensioned filaments by sharply deflecting them laterally with interdigitating mechanical deflectors and removing the resulting sliver from the tensioning zone. A sliver of stretch broken, high strength, high modulus p-aramid fibers said fibers being essentially aligned in the direction of the sliver and of which at least 10%, preferably at least 50%, of the fiber ends are fibrillated into at least 2, preferably at least 5, fibrils along a terminal length which is at least 5, preferably at least 50, times as long as the diameter of the unfibrillated portion of the fiber, can readily be formed by this process. Preferably 70 to 80% of the fibers in the sliver have fibrillated ends and at least 50% of the fibrillated stretch broken fibers have 5-20 fibrils per end. The number of fibrils counted includes the stem of the fiber as a fibril. Most preferably the fibrillated terminal lengths are 100 to 350 times the fiber diameter. "Terminal Length" in multiples of d, the fiber diameter, is the length of fiber along which fibrillation extends. It is the distance between where the first fibril separates from the fiber to the tip of the furthest extending fibril at that end. The Turbo Stapler, manufactured by the Turbo Machine Co., Lansdale, Pa. or equivalent equipment may be employed to make the sliver. The FIGURE schematically represents apparatus of this type with certain elements thereof being bypassed. In the FIG. 1 is a creel for continuous-filament packages; 2, 3, and 4 comprise a system of guides for the yarns coming off the packages which serves to adjust the band width and the uniformity of its thickness; 5 are infeed rolls, while intermediate rolls 7 firmly grip the band and feed it at a constant rate to front roll 8 which also firmly grips the band and withdraws it at a somewhat higher speed from the breaker bars 9. Broken sliver 20 is condensed in a cylindrical ceramic guide 11 and is fed to a wind-up for packaging. The fibrillation of the fiber in the sliver is sufficient to enable the sliver to be pulled through the ceramic guide and wind-up without disassociation of the fibers in the sliver. A sliver useful for this invention is fully described in U.S. Pat. No. 4,477,526 (Oct. 16, 1984) which is hereby incorporated by reference.

Formable and cured planar and shaped non-planar composites are contemplated by the present invention. It is believed that the superior composite properties are due to the combination of fiber alignment in the sliver and the fibrillation as described. It is also believed that increased fiber length plays a role in improved strength. For the formable composites, that is, those composites that can be formed into shaped non-planar three-dimensional structures at elevated temperatures (where necessary), matrix resins of the thermoplastic variety or of the not fully cured thermoset type may be employed. In the latter case the thermosettable resin is cured after the composite has been shaped. Suitable thermoplastic resins include polyesters (including copolyesters), e.g., polyethylene terephthalate, Kodar ® PETG copolyester 6763 (Eastman Kodak) polyamides, e.g., nylon 6,6, and polyolefins, e.g., polypropylene. Thermosetting resins that are useful include phenolic resins, epoxy resins and vinyl ester resins.

The ratio of reinforcement to matrix resin can vary. Normally at least 5% by volume of silver is employed in the composite, preferably between 30 and 60% by volume.

The composite may be made by a variety of procedures. Thus, a stretch broken sliver may be wound on a frame covered with a film of thermoplastic resin to form a warp. The warp of stretch-broken sliver, however, can be made by any technique known to those skilled in the art, e.g., by creeling or beaming. A preform is obtained when another film of thermoplastic resin is placed over the warp to form a sandwich which is removed from the frame. Several of such preforms may be stacked while offset to provide multi-directionality and then the stack may be heated under pressure to form a composite structure.

Other techniques for applying matrix polymer include sprinkling of powdered resin on the sliver warp followed by heating to melt the resin, flowing liquid resin over the sliver warp, intermingling thermoplastic fiber with the sliver warp and then heating to melt the thermoplastic fiber thereby forming the matrix resin, calendering the warp between layers of matrix film, etc.

Test Procedures

The yarns to be tested for tenacity and modulus are preconditioned at 50° C. for 3 hours and then conditioned at 24° C. and 55% relative humidity for 24 hours before testing. The tensile properties are determined on a laboratory tensile tester with suitable clamps for yarn using a gauge length of 25.4 cm and a rate of elongation of 12.7 cm/min (50%/min).

The composite tensile tests followed the general procedure described in ASTM Test D-3039 entitled "Standard Test Method for Tensile Properties of Fiber-Resin Composites" with the following exceptions: (a) the gage length of the samples between aluminum tabs was a nominal 3 inches; (b) the speed of the cross-head was 0.1 inch/min.

The impact tests were run on a machine specially instrumented for data acquisition. The tests followed the general procedure described in ASTM Test D-3029-82a [Impact Resistance of Rigid Plastic Sheeting or Parts by Means of a Tup (Falling Weight)], except that (a) data collection was with an instrumented impact device and (b) sample size was 1.5×1.5 inches. These tests were run by Method G of the Standard, using Geometry B.

EXAMPLE 1

Four ends of 1519 denier continuous filament p-aramid yarn having a yarn tenacity of about 22.2 gpd., an elongation of about 3.1% and a modulus of about 517 gpd were stretch-broken on the Turbo stapler in the general manner described in Example 1 of the aforementioned U.S. Pat. No. 4,477,526 except that the crimper of the Turbo stapler was bypassed and the resultng 2044 denier sliver was wound up without twist directly on a wind-up (Leesona). The stretch-broken staple of this sliver has an average length of 5.1" (shortest 3.2", longest 6.2") and had at least 50% of the fiber ends fibrillated into at least five fibrils along a terminal length which is at least 50 times as long as the unfibrillated portion of each fiber.

A "warp" was prepared from this sliver by winding it, 12 ends to the inch, on a 15"×15" frame. A 1.5–2.0 mil film of thermoplastic resin (amorphous polyethylene terephthalate, Kodar ® PETG copolyester 6763) was placed on the frame before winding the sliver and another was added after winding was complete. The entire sandwich was vacuum bagged at 200° C. in an oven for ½ hour after which time it was cut from the frame. This product, called a preform, was now a well-impregnated, relatively stiff matrix/stretch-broken sliver sandwich, in which all the slivers were aligned in one direction.

Eight of these preforms were stacked on top of each other, the direction of the stretch-broken sliver warp being offset by 45° in a clockwise direction in successive layers. The bottom plane of the fourth layer was considered a reflecting plane and the next four layers were stacked so that the warp directions of the stretch-broken sliver were mirror images of the top four layers with respect to that plane. If necessary, the layers were interleaved with additional layers of matrix film so that the fiber volume fraction in the final product was about 36% (40% by weight of fiber). The stack of eight preforms was again vacuum bagged and heated in an oven at 200° C. for ½ hour to form a well-consolidated, balanced, stiff, quasi-isotropic composite plate.

The thickness of the plate was 60 mils, and it weighed 140 g. The plate was cut into 0.5" strips, provided with aluminum tabs and an impact test as well as composite tensile tests were run at 2.8" gage length. The following results were obtained with the specimen lined up in the tensile testing machine with the two central (mirror image) reflecting layers in the direction of cross-head motion:

Tensile strength, kpsi: 38.2
Modulus, kpsi: 1656 Dart Impact Test Maximum Force, N: 5350

It was concluded that the product had very high strength and modulus and excellent impact resistance.

Similarly constructed plates were heated to 220° C. and then placed in a press and molded. The plate conformed very well to the shape of the mold and it was concluded that the product was formable.

Comparative Example A: Composite from continuous filament p-aramid yarn

A warp, preform and plate were constructed as in Example 1, except that the fiber used was 1500 denier continuous filament p-aramid yarn which had not been stretch broken. In order to achieve a product comparable in weight, thickness and construction to Example 1, the end count of continuous filament yarn was increased to 15 epi (ends per inch) vs. 12 for the stretch broken sliver of Example 1. The thickness of the plate of continuous filament p-aramid was 55 mil and the weight was 139 g. It also contained approximately 36.6% fiber by volume. Tensile tests were carried out on this plate exactly as in Example 1 with the following results:

Tensile Strength, kpsi: 46.7
Modulus, kpsi: 1992
Dart Impact Test Maximum Force, N: 1850

It was concluded that the product of Example 1 exhibited the strength and stiffness expected of continuous filament p-aramid. Its impact resistance was very good. The product of Example 1, although made of discontinuous staple fiber, came within 80 percent of the strength and stiffness of the continuous filament product and exhibited an impact resistance almost three times as good as the continuous filament. This excellent performance with respect to strength, stiffness and impact of the product containing the stretch-broken sliver is believed to be due to the special morphology of stretch-broken aramid fibers.

A plate similar to the one of Comparative Example A, containing the continuous filament p-aramid reinforcement, was molded and came out with uneven areas, wrinkles and slack filaments, an indication that it did not conform to the mold as well as the product containing the staple fiber. It was concluded that the product of this example containing the continuous filament p-aramid could not be satisfactorily formed.

The overall conclusion is that a composite reinforced with stretch-broken p-aramid sliver, due to the unique morphology of the fiber, viz., its fibrillated ends, provides an unusually advantageous product which has about 80% of the tensile strength and stiffness of a similar product with continuous filament reinforcement but almost three times the impact resistance and, unlike the product reinforced with continuous filament, is formable by molding into complex shapes.

Comparative Example B: Composite from Regular Staple Yarn

A quasi-isotropic plate was prepared as in Example 1, except that the reinforcing fiber was not stretch-broken p-aramid sliver but a roving of 1.5" cut, crimped p-aramid staple. The denier of the roving was 5515. The resulting plate was 170 mil thick and weighed 337 g. The following tensile data were obtained on the plate:
Tensile Strength, kpsi: 19.5
Tensile Modulus, kpsi: 862
The tensile strength of this plate was only about 42% of that of the similar plate made from continuous filament p-aramid yarn, while its modulus was 43% of that of the same control plate.

EXAMPLE 2

A composite was made in substantially the same manner as in Example 1 except that 5 ends of poly(p-phenylene terephthalamide) yarn were used in the stretch-break machine, the yarn (1000 filament) denier was 1473, and the sliver denier was 2327. The yarn fed to the stretch-break machine had a tenacity of 16.6 grams per denier (gpd), an elongation of 1.86% and a modulus of 872 gpd. The distribution of fibrillated ends of 10 filaments of the stretch-broken sliver was as follows:

TABLE

| Fiber End No. | No. of Fibrils Along Terminal Length | Terminal Length in Diameters |
|---|---|---|
| 1 | 8 | 345 |
| 2 | 8 | 260 |
| 3 | 8 | 210 |
| 4 | 8 | 100 |
| 5 | 7 | 30 |
| 6 | 6 | 175 |
| 7 | 6 | 50 |
| 8 | 4 | 430 |
| 9 | 4 | 45 |
| 10 | 4 | 25 |
| 11 | 4 | 20 |
| 12 | 4 | 5 |
| 13 | 3 | 140 |
| 14 | 3 | 50 |
| 15 | 3 | 25 |
| 16 | 3 | 8 |
| 17 | 2 | 80 |
| 18 | 2 | 10 |
| 19 | 1 | — |
| 20 | 1 | — |

According to the above table, 18 fiber ends or 90% of the fiber ends had at least 2 fibrils along the terminal length which was at least 5 diameters in length.

The composite plate made as in Example 1, weighed 148 g and had a thickness of 58 mils. When tested, the composite had a modulus, Kpsi of 1750, which is about 71% of that obtained with continuous filaments.

EXAMPLE 3

An octagonal frame, 16 inches side to side with a 12 inch circle cut out of the center (frame made of ¼ inch aluminum) was wound with stretch-broken sliver similar to that of Example 2 so as to make an eight layer string-skeleton, approximately ten ends per inch.

The frame was then placed in a tray and 650 grams of epoxy resin (Ciba-Geigy Epon 8132 with Ciba-Geigy HY-1930 hardener, ratio of resin to hardener of 2:1) was poured on it and evenly distributed by means of metal plates. The frame was then removed from the tray and hung on a hook to drip-dry. After 3 to 4 hours, the frame was placed in a press with a mold having a dish-like depression so that the center part of the frame was over the depression while the sliver was restrained by the frame. The press was closed and the mold was heated to 60° C. for two hours after which it was allowed to remain overnight in the same condtion.

The next day, the press was opened. A dish had been molded in the center of the frame, the stretch-broken sliver having been stretched where necessary to fill the mold. No breaks appeared, thus demonstrating formability and drawability.

We claim:
1. A composite comprising a matrix resin reinforced with sliver of high modulus p-aramid fibers of which at least 10% of the fiber ends are fibrillated into at least 2 fibrils along a terminal length which is at least 5 times as long as the diameter of the unfibrillated portion of the fiber.

2. A composite according to claim 1 wherein at least 50% of the fiber ends of the sliver are fibrillated into at least 5 fibrils along a terminal length which is at least 50 times as long as the diameter of the unfibrillated portion of the fiber.

3. A composite according to claim 2 wherein the fiber comprises at leat 5% by volume of the components.

4. A composite according to claim 3 wherein the fiber comprises between 30 and 60% by volume of the composite.

5. A composite according to claim 1 wherein the matrix is a thermoplastic resin.

6. A composite according to claim 1 wherein the matrix resin is a polyester.

7. A composite according to claim 1 wherein the matrix is a thermosetting resin.

8. A composite according to claim 1 wherein the matrix is an epoxy resin.

* * * * *